(12) United States Patent
Wu et al.

(10) Patent No.: US 8,771,630 B2
(45) Date of Patent: Jul. 8, 2014

(54) METHOD FOR THE PREPARATION OF GRAPHENE

(75) Inventors: Yi-Shuen Wu, Yilan County (TW);
Cheng-Yu Hsieh, Yilan County (TW);
Cheng-Shu Peng, Yilan County (TW);
Jing-Ru Chen, Yilan County (TW);
Jun-Meng Lin, Yilan County (TW);
Geng-Wei Lin, Yilan County (TW)

(73) Assignee: Enerage, Inc., Yilan County (TW)

( * ) Notice: Subject to any disclaimer, the term of this patent is extended or adjusted under 35 U.S.C. 154(b) by 14 days.

(21) Appl. No.: 13/358,912

(22) Filed: Jan. 26, 2012

(65) Prior Publication Data
US 2013/0197256 A1   Aug. 1, 2013

(51) Int. Cl.
| | | |
|---|---|---|
| *H01B 1/00* | (2006.01) | |
| *C01B 31/00* | (2006.01) | |
| *C01B 31/04* | (2006.01) | |
| *D01F 9/12* | (2006.01) | |
| *B82Y 40/00* | (2011.01) | |
| *C04B 35/532* | (2006.01) | |

(52) U.S. Cl.
CPC ............ *C01B 31/0438* (2013.01); *B82Y 40/00* (2013.01); *C04B 35/532* (2013.01); *C01B 31/04* (2013.01); *C01B 31/00* (2013.01); *Y10S 977/734* (2013.01); *Y10S 977/847* (2013.01)
USPC ............... 423/448; 423/415.1; 423/447.2; 423/447.1; 252/500; 977/734; 977/847

(58) Field of Classification Search
None
See application file for complete search history.

(56) References Cited

U.S. PATENT DOCUMENTS

| | | | |
|---|---|---|---|
| 7,658,901 B2 | 2/2010 | Prud'Homme et al. | |
| 7,824,651 B2 | 11/2010 | Zhamu et al. | |
| 8,568,685 B2 * | 10/2013 | Strano et al. | 423/447.1 |
| 2010/0105834 A1 * | 4/2010 | Tour et al. | 525/50 |
| 2010/0237296 A1 | 9/2010 | Gilje | |
| 2010/0303706 A1 | 12/2010 | Wallace et al. | |
| 2012/0063988 A1 * | 3/2012 | Tour et al. | 423/415.1 |
| 2012/0129736 A1 * | 5/2012 | Tour et al. | 507/140 |
| 2013/0015409 A1 * | 1/2013 | Fugetsu | 252/500 |
| 2013/0108540 A1 * | 5/2013 | Baek et al. | 423/448 |

OTHER PUBLICATIONS

Pei et al., "Direct Reduction of Graphene Oxide Films into Highly Conductive and Flexible Graphene Films by Hydrohalic Acids", Elsevier-Carbon, (2010), pp. 4466-4474, No. 48.

* cited by examiner

*Primary Examiner* — Guinever Gregorio
(74) *Attorney, Agent, or Firm* — Muncy, Geissler, Olds & Lowe, P.C.

(57) ABSTRACT

A method for the preparation of graphene is provided, which includes: (a) oxidizing a graphite material to form graphite oxide; (b) dispersing graphite oxide into water to form an aqueous suspension of graphite oxide; (c) adding a dispersing agent to the aqueous suspension of graphite oxide; and (d) adding an acidic reducing agent to the aqueous suspension of graphite oxide, wherein graphite oxide is reduced to graphene by the acidic reducing agent, and graphene is further bonded with the dispersing agent to form a graphene dispersion containing a surface-modified graphene. The present invention provides a method for the preparation of graphene using an acidic reducing agent. The obtained graphene can be homogeneously dispersed in water, an acidic solution, a basic solution, or an organic solution.

4 Claims, 6 Drawing Sheets pH 4 pH 10

METHOD FOR THE PREPARATION OF GRAPHENE

BACKGROUND OF THE INVENTION

1. Field of the Invention

The present invention relates to a method for the preparation of graphene, and particularly relates to a method for the preparation of a graphene dispersion containing a surface-modified graphene.

2. The Prior Arts

Graphene has been commonly referred to as monolayer graphite whose structure is one-atom-thick planar sheets of $sp^2$-bonded carbon atoms that are densely packed in a honeycomb crystal lattice. Graphene has mixed covalent and metallic bonding. In 2004, Andre Geim and Konstantin at the Manchester University obtained monolayer graphene by using an adhesive tape to repeatedly split graphite crystals. In 2010, the Nobel Prize in Physics was awarded to Andre Geim and Konstantin.

Graphene appears to be the thinnest and strongest materials ever tested. Thermal conductivity of graphene is higher than that of carbon nanotube and diamond. Electron mobility of graphene is higher than that of carbon nanotube and silicon crystal at room temperature. The resistivity of graphene is less than that of copper or silver, and graphene is the lowest resistivity substance ever known. Graphene and carbon nanotube have high flexibility and low optical reflectivity so that they are used as a preferred soft electronic material. However, the graphene dispersion is more difficult to be coated in comparison with the carbon nanotube dispersion. Graphene tends to aggregate irreversibly into large clusters and even restacks to form graphite. New strategies to produce a uniform monolayer graphene film while keeping them individually separated are required.

Graphene can be produced by exfoliation, direct growth, or produced from carbon nanotubes, wherein graphene powder can be produced by using exfoliation techniques. However, graphene can be mass-produced via the oxidation and reduction process, and in such a process, a graphite material is oxidized to form graphite oxide, then graphene is obtained by the exfoliation and reduction of graphite oxide.

In US 20100237296, graphene oxide is dispersed into water to form a dispersion, and then a water-insoluble organic solvent is added to the dispersion, followed by heating at about 200° C. under stirring to form graphene. Although the organic solvent is used as reducing agent in US 20100237296, its reductibility is not high enough. Therefore, the operation temperature has to be increased to as high as the boiling point of the organic solvent so that the organic solvent is required to be continuously added during the reduction process.

In U.S. Pat. No. 7,824,651, graphite is directly placed in a solution containing a dispersing agent to obtain a suspension, and the suspension is exposed to ultrasonic waves at an energy level of greater than 80 watts to exfoliate graphite into a monolayer graphene with a thickness smaller than 10 nm. However, it takes a long time to obtain the desired size of graphene by mechanical force, which causes the increase of the energy consumption.

In U.S. Pat. No. 7,658,901, the thermally exfoliated graphite oxide in powder form is obtained from heating graphite oxide, and the thermally exfoliated graphite oxide is placed over a hot source under protective atmosphere for a period of time to obtain monolayer graphene. This method is simple, but the powder size and the oxygen content in each batch are hard to be controlled, and thereby the stability of the product is low.

In US 20100303706, the graphite oxide is placed into a basic solution containing hydrazine or $NaBH_4$ under stirring, and consequently graphene oxide is reduced to form a graphene dispersion by hydrazine or $NaBH_4$. However, hydrazine is highly toxic and usage should be minimized. If graphite oxide is reduced in a non-basic solution, the degree of agglomeration in the obtained graphene dispersion becomes serious.

Songfeng Pei et al. in Carbon (journal) of the year 2010 disclosed that a graphene oxide film can be reduced into a graphene film by HI acidic solution. They also found that if the graphene oxide film is reduced into a graphene film by hydrazine, the graphene film will break up in water to form a dispersion. However, the graphene film is kept in an acidic solution due to agglomeration.

Accordingly, the reduction of graphene oxide suspension should be carried out in a basic environment in order to form a graphene dispersion with uniform dispersibility. If the reduction of graphene oxide suspension is carried out in a non-basic environment, graphene tends to agglomerate or even restack upon reduction, so that the formed graphene dispersion contains agglomerates.

SUMMARY OF THE INVENTION

An objective of the present invention is to provide a method for the preparation of graphene, which comprises: (a) oxidizing a graphite material to form graphite oxide; (b) dispersing graphite oxide into water to form an aqueous suspension of graphite oxide; (c) adding a dispersing agent to the aqueous suspension of graphite oxide; and (d) adding an acidic reducing agent to the aqueous suspension of graphite oxide, wherein graphite oxide is reduced to graphene by the acidic reducing agent, and graphene is further bonded with the dispersing agent to form a graphene dispersion containing a surface-modified graphene.

The graphite material is selected from the group consisting of natural graphite, expandable graphite, artificial graphite, graphite fiber, carbon nano-tube, and mesophase carbon micro-bead.

The dispersing agent has two terminal ends, and such a dispersing agent has a sulfonic acid group or a cholic acid group at its one terminal end, and a long carbon chain or a phenyl group at its another terminal end, wherein one of the sulfonic acid group and the cholic acid group at one terminal end of the dispersing agent is bonded to the surface of graphene, and thereby the surface of graphene is modified by the presence of the long carbon chain or the phenyl group at another terminal end of the dispersing agent. The dispersing agent is selected from the group consisting of dodecyl sulfate, dodecyl benzenesulfonate, cholate, deoxycholate, and taurodeoxycholate.

The acidic reducing agent is selected from the group consisting of ascorbic acid, citric acid, polyphenol, and hydrohalic acid, wherein hydrohalic acid is hydrogen iodide or hydrogen bromide.

The method for the preparation of graphene of the present invention further comprises the step of: (e) drying the graphene dispersion to obtain graphene powder including the surface-modified graphene. The graphene powder obtained by other methods can be further reduced using the method of the present invention.

The present invention provides a method for the preparation of graphene using an acidic reducing agent. The graphene prepared by the method of the present invention can be homogeneously dispersed in water, an acidic solution, a basic solution, or an organic solution without aggregation of powder particles. The oxygen content of graphene powder is low, and thereby the graphene powder prepared by the method of the present invention has wider application and better performance than the graphene powder prepared by other methods in the prior art.

DETAILED DESCRIPTION OF THE PREFERRED EMBODIMENT

Hereinafter, the preferred embodiments of the present invention will be described in detail with reference to the accompanying drawing.

Figure 1:
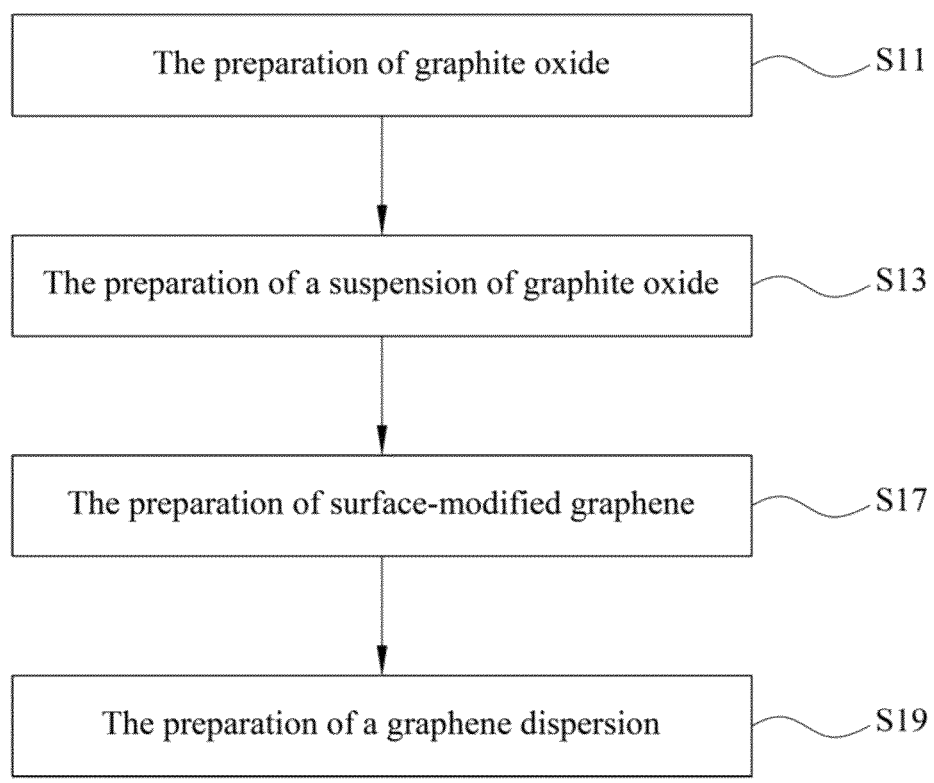
FIG. 1 is a flow chart depicting the steps of the method for the preparation of graphene according to the present invention.

FIG. 1 depicts the flow chart of the method for the preparation of graphene in accordance with one embodiment of the present invention. As shown in FIG. 1, the method for the preparation of graphene S1 comprises the following steps. In step S11, a graphite material is oxidized to graphite oxide. In Step S13, graphite oxide is dispersed into water to form an aqueous suspension of graphite oxide. In step S15, a dispersing agent is added to the aqueous suspension of graphite oxide. In step S17, an acidic reducing agent is added to the aqueous suspension of graphite oxide so that the graphite oxide is reduced to form graphene, and the formed graphene can be further bonded with the dispersing agent, and thus a graphene dispersion containing a surface-modified graphene is obtained.

In step S11, the graphite material is selected from the group consisting of natural graphite, expandable graphite, artificial graphite, graphite fiber, carbon nano-tube, and mesophase carbon micro-bead. The oxidation of graphite into graphite oxide is carried out by using, for example, Hummers' method. After the graphite material is oxidized, a lot of carbon-oxygen groups (such as C—O and C=O groups) are present in the graphite material so as to form a swelling, bulky and hydrophilic graphite oxide.

In step S15, the dispersing agent with two terminal ends used in the present invention has a sulfonic acid group or a cholic acid group at its one terminal end, and has a long carbon chain or a phenyl group at its another terminal end. Because one of the sulfonic acid group and the cholic acid group at one terminal end of the dispersing agent is bonded to the surface of graphene, the surface of graphene can be modified by the presence of the long carbon chain or the phenyl group at another terminal end of the dispersing agent, and the long carbon chain or the phenyl group at the terminal end of the dispersing agent can provide a steric barrier for the graphene powder to prevent the aggregation of graphene powder particles, and thereby the graphene reduced from graphite oxide can be dispesed well. The dispersing agent is selected from the group consisting of dodecyl sulfate, dodecyl benzenesulfonate, cholate, deoxycholate, and taurodeoxycholate.

In step S17, the acidic reducing agent used in the present invention is selected from the group consisting of ascorbic acid, citric acid, polyphenol, and hydrohalic acid, and the aqueous solution of ascorbic acid, citric acid, or polyphenol is acidic, and shows an excellent antioxidability and reducibility, wherein ascorbic acid, citric acid, and polyphenol are nontoxic and more environmentally-friendly as compared with the very toxic hydrazine used in the prior art. Moreover, hydrohalic acid, especially hydrogen iodide or hydrogen bromide, having a relatively high reducibility can be used as an acidic reducing agent in the present invention.

From step S13 to step S17, the color of the aqueous suspension of graphite oxide will turn from light brown to deep brown. After an acidic reducing agent is added into the aqueous suspension of graphite oxide to reduce graphite oxide to graphene, a black-colored graphene dispersion containing the surface-modified graphene is obtained, wherein the surface of graphene, which is bonded with the dispersing agent, is modified by the presence of the long carbon chain or the phenyl group at the terminal end of the dispersing agent.

The method for the preparation of graphene S1 can further comprise the step of drying the graphene dispersion to obtain graphene including the surface-modified graphene in powder form. The drying method includes filter-drying, spray drying, freeze drying, and hot wind drying methods.

The graphene powder obtained by other methods can be further reduced by the method of the present invention to decrease the oxygen content of graphene. The dispersing agent used in the present invention is firstly dissolved in water to form an aqueous dispersing agent solution. Then, the graphene powder obtained by other methods is added to the formed aqueous dispersing agent solution. One of the sulfonic acid group and the cholic acid group at one terminal end of the dispersing agent will be quickly bonded to the surface of graphene, and the long carbon chain or the phenyl group present at another terminal end of the dispersing agent will provide a steric barrier for the graphene powder to prevent the aggregation of graphene powder particles, and thereby the graphene powder can be dispersed well in the aqueous dispersing agent solution to form a homogeneous graphene dispersion including the surface-modified graphene. Then, an acidic reducing agent is added to the aqueous graphene dispersion to further reduce the surface-modified graphene in the aqueous graphene dispersion to decrease the oxygen content of the surface-modified graphene so that the purity of the surface-modified graphene is increased. Then, the aqueous graphene dispersion is dried to obtain the graphene powder with high purity.

Figure 2:
FIG. 2 shows a yellow brown well-dispersed graphite oxide suspension according to the present invention.

The following Examples 1 to 5 illustrate the method for the preparation of graphene in accordance with the present invention. The aqueous suspension of graphite oxide is obtained by Hummers' method. In Hummers' method, 10 g of graphite powder is added to 230 ml of sulfuric acid (WSW followed by addition of 30 g of potassium permanganate ($KMnO_4$) under stirring in ice bath to maintain a reaction temperature below 20° C., and then the mixture is continuously stirred at 35° C. for at least 40 minutes after the reaction is complete. After that, 460 ml of deionized water is slowly added to the mixture, and then the mixture solution is continuously stirred in water bath at 35° C. for at least 20 minutes until the reaction is complete. After that, 1.4 L of deionized water and 100 ml of hydrogen peroxide ($H_2O_2$) solution are added to the mixture solution, and then the resultant solution is stood for 24 hours. Finally, the oxidized material is washed with 5% of hydrochloric acid followed by filtering and drying under vacuum to thus obtain graphite oxide powder with oxygen content of 45% to 55%. Then, the obtained graphite oxide powder is placed into water to obtain a yellow brown well-dispersed graphite oxide suspension (as shown in FIG. 2) with a concentration of 1 mg/mL.

EXAMPLE 1

Figure 3:
FIG. 3 shows a black well-dispersed graphene dispersion according to the present invention.
Figure 4:
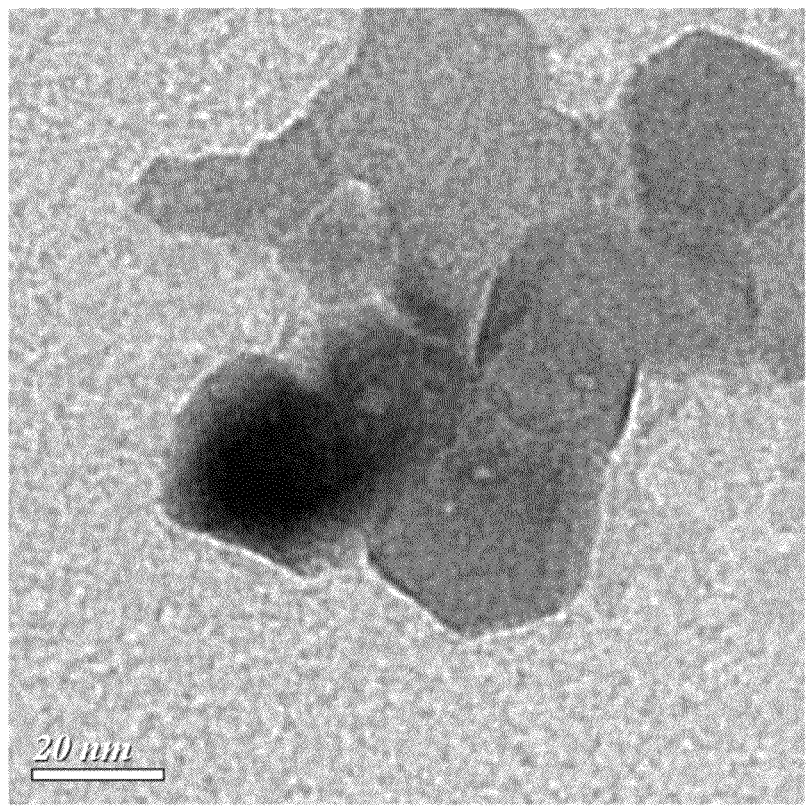
FIG. 4 shows a TEM image of the black well-dispersed graphene dispersion according to the present invention.
Figure 4:
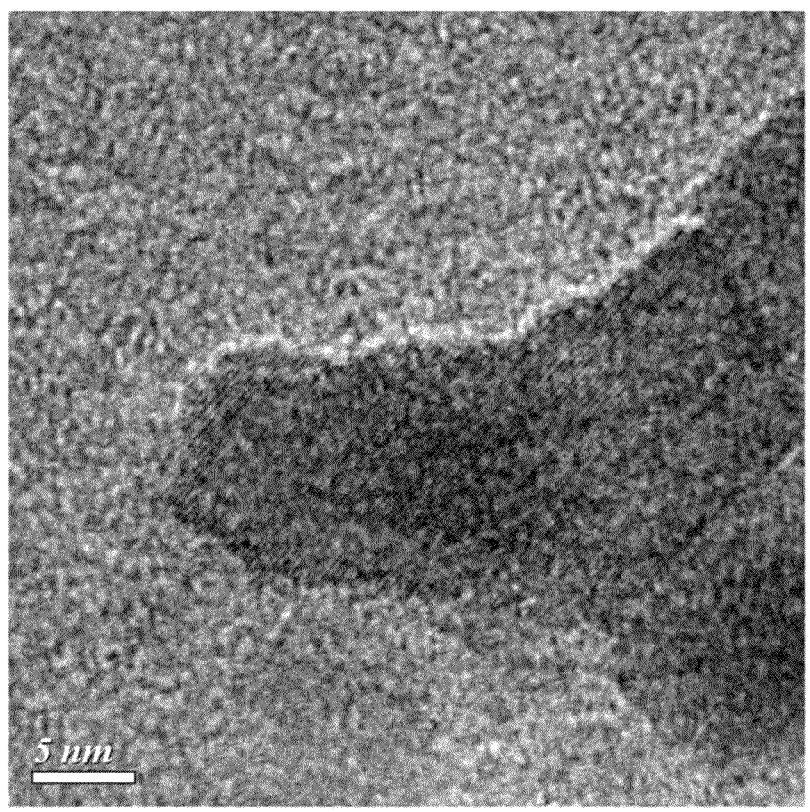

0.5 g of sodium dodecylbenzene sulphonate (SDBS) as dispersing agent is added to 300 mL of graphite oxide suspension until all the solids have been dissolved, followed by ultrasonic treatment for 10 minutes. Then, 1 g of ascorbic acid as acidic reducing agent is added to the resultant solution, and then the mixture is continuously stirred for 24 hours to form a black well-dispersed graphene dispersion (as shown in FIG. 3), and its pH is about 4 and its TEM image is presented in FIG. 4.

EXAMPLE 2

Figure 5:
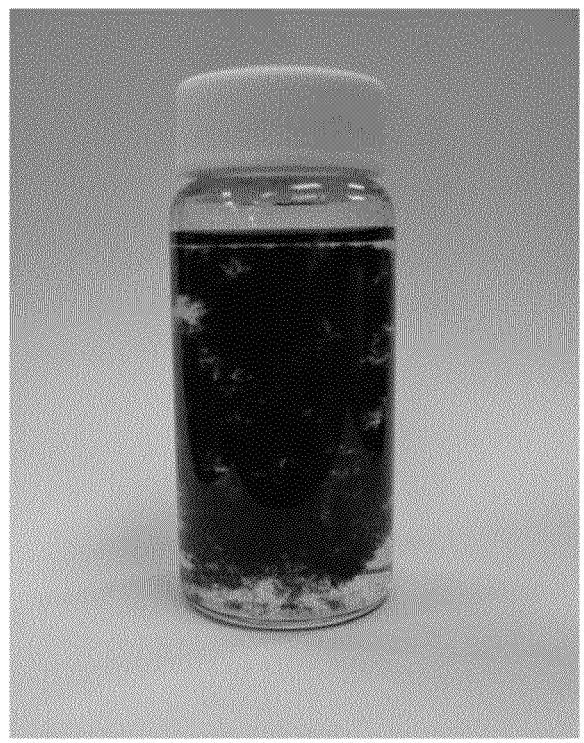
FIG. 5 shows a black graphene dispersion containing agglomerates of graphene powder particles without the dispersing agent of the present invention.

1 g of ascorbic acid as acidic reducing agent is directly added to 300 mL of graphite oxide suspension followed by stirring for 24 hours to form a black graphene dispersion containing agglomerates of graphene powder particles (as shown in FIG. 5).

EXAMPLE 3

The graphene dispersion of EXAMPLE 1 is filtered, and dried in oven at a temperature of 90° C. to thus obtain graphene powder with oxygen content of 4.8 wt % (measured by nitrogen and oxygen analyzer) which is much lower than the oxygen content of graphite oxide.

EXAMPLE 4

Figure 6:
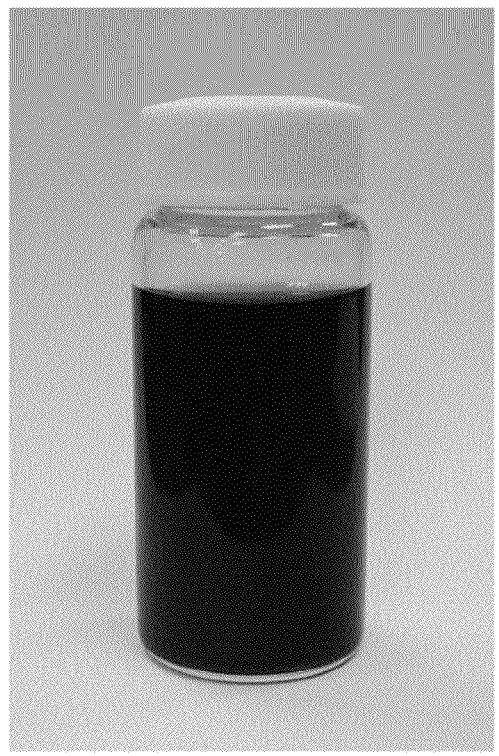
FIG. 6 shows that the graphene powder is respectively well-dispersed into the aqueous solutions with pH 4 and pH 10 according to the present invention.
Figure 6:
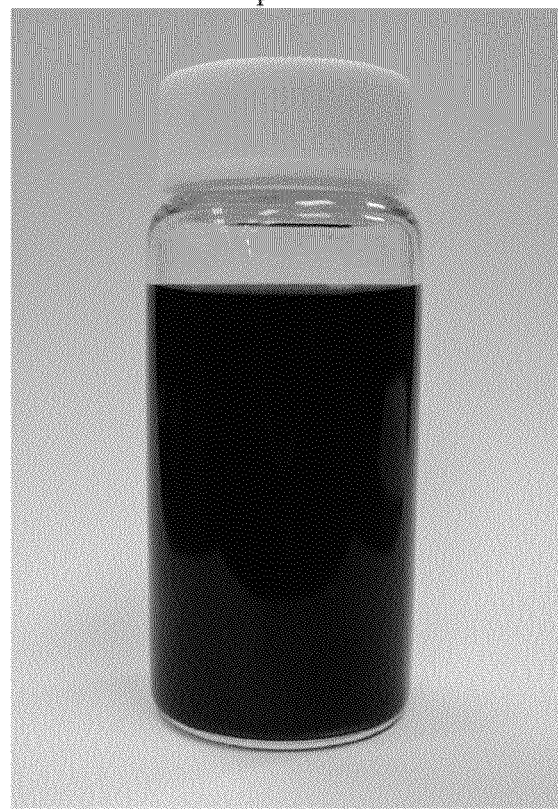

The graphene powder of EXAMPLE 3 is respectively placed into the aqueous solution with pH 4 and the aqueous solution with pH 10 under stirring. It is found that the graphene powder of EXAMPLE 3 can be quickly well-dispersed into the aqueous solutions with pH 4 and pH 10 (as shown in FIG. 6).

EXAMPLE 5

The graphite oxide powder is instantaneously contacted with a hot source at a temperature of 1100° C. for 1 minute under vacuum to undergo thermal exfoliation and pre-reduction so as to obtain a graphene powder with oxygen content of 12 wt %. 0.5 g of sodium dodecylbenzene sulphonate as dispersing agent is added to 100 mL of water to obtain an aqueous dispersing agent solution. Then, 100 mg of graphene powder is added to the aqueous dispersing agent solution, followed by ultrasonic treatment for 10 minutes. Then, 1 g of ascorbic acid as acidic reducing agent is added to the resultant solution followed by stirring for 24 hours, filtering and drying so as to obtain a surface-modified graphene powder. The surface-modified graphene powder has oxygen content of 6.5 wt % which is measured by nitrogen and oxygen analyzer. The oxygen content of the surface-modified graphene powder obtained by thermal exfoliation method can be effectively reduced.

EXAMPLE 6

The graphene dispersion of EXAMPLE 1 is dropped on a glass substrate, followed by spin coating at 300 rpm for 10 minutes to obtain a thin film. Then, the thin film is completely dried in an oven at 90° C., followed by drying in a furnace at 600° C. in an atmosphere of argon for one hour to obtain a graphene film. The conductivity of the thin film measured by the four-point probe method is 20 S/cm.

The present invention provides a simple and effective method for the preparation of graphene using an acidic reducing agent. The obtained graphene can be homogeneously dispersed in water to form a stable graphene dispersion for several days. Furthermore, the graphene powder prepared by the method of the present invention can be quickly and homogeneously dispersed in an acidic solution, a basic solution, or an organic solution without aggregation of powder particles.

The graphene powder obtained by any other methods can be further reduced by the method of the present invention to decrease the oxygen content of graphene powder, and thereby the purity and the stability of the graphene powder are increased, so that the commercial value of the graphene powder is increased greatly.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A method for the preparation of graphene, comprising:
   (a) oxidizing a graphite material to form graphite oxide;
   (b) dispersing graphite oxide into water to form an aqueous suspension of graphite oxide;
   (c) adding a dispersing agent to the aqueous suspension of graphite oxide; and (d) adding an acidic reducing agent to the aqueous suspension of graphite oxide, graphite oxide being reduced to graphene by the acidic reducing agent, graphene being further bonded with the dispersing agent to form a grapheme dispersion including a surface-modified graphene,
   wherein the dispersing agent has two terminal ends, and has a cholic acid group at its one terminal end, and has a phenyl group at its another terminal end, the cholic acid group at one terminal end of the dispersing agent is bonded to the surface of graphene, and thereby the surface of graphene is modified by the presence of the phenyl group at another terminal end of the dispersing agent, and the acidic reducing agent is selected from the group consisting of ascorbic acid, citric acid, and polyphenol.

2. The method according to claim 1, wherein, the graphite material is selected from the group consisting of natural graphite, expandable graphite, artificial graphite, graphite fiber, carbon nano-tube, and mesophase carbon micro-bead.

3. The method according to claim 1, wherein the dispersing agent is selected from the group consisting of cholate, deoxycholate, and taurodeoxycholate.

4. The method according to claim 1, further comprising the step of: (e) drying the graphene dispersion to obtain graphene powder including the surface-modified graphene.

* * * * *